United States Patent [19]
Jin et al.

[11] Patent Number: 5,762,866
[45] Date of Patent: Jun. 9, 1998

[54] ARTICLE COMPRISING A PB-FREE SOLDER HAVING IMPROVED MECHANICAL PROPERTIES

[75] Inventors: Sungho Jin, Millington; Mark Thomas McCormack, Summit, both of N.J.

[73] Assignee: Lucent Technologies Inc., Murray Hill, N.J.

[21] Appl. No.: 502,941

[22] Filed: Jul. 17, 1995

Related U.S. Application Data

[63] Continuation of Ser. No. 368,728, Jan. 4, 1995, abandoned, which is a continuation of Ser. No. 284,028, Aug. 1, 1994, abandoned, which is a continuation of Ser. No. 20,508, Feb. 22, 1993, abandoned.

[51] Int. Cl.$^6$ .............................. C22C 13/00; C22C 13/02
[52] U.S. Cl. ................................ 420/557; 420/562
[58] Field of Search ........................ 420/557, 561, 420/562

[56] References Cited

U.S. PATENT DOCUMENTS

| | | | |
|---|---|---|---|
| 1,437,641 | 12/1922 | Ferriere et al. | 420/562 |
| 4,670,217 | 6/1987 | Henson | 420/562 |
| 4,695,428 | 9/1987 | Ballentine | 420/560 |

FOREIGN PATENT DOCUMENTS

| | | |
|---|---|---|
| 499452 | 8/1992 | European Pat. Off. . |
| C806820 | 6/1951 | Germany . |
| B1080838 | 4/1960 | Germany . |
| 50-56347 | 5/1975 | Japan ............. 420/557 |
| A131299 | 8/1919 | United Kingdom . |

OTHER PUBLICATIONS

Irving, B., "Host of New Lead–Free Solders Introduced," *Welding Journal*, vol. 71, No. 10, Oct. 1992, pp. 47–49.
McCormack, M. T. et al., "Progress in the Design of New Lead–Free Solder Alloys," *JOM*, vol. 45, No. 7, Jul. 1993, pp. 36–40.
W. B. Hampshire, "Solders" *Electronic Materials Handbook*, vol. 1, pp. 633–642, (1989).

*Primary Examiner*—Sikyin Ip
*Attorney, Agent, or Firm*—Eileen D. Ferguson

[57] ABSTRACT

A high-strength Pb-free solder alloy, based on the Sn—Ag—Zn system, is disclosed. The Pb-free solder alloy contains, in weight percent, 0.2–0.6% Zn, 1–6% Ag, one or both 0.2–0.6% In and 0.2–0.6% Bi, and the balance Sn. The addition of Zn significantly improves the mechanical strength and creep resistance of e.g., Sn—3.5% Ag eutectic solder while maintaining substantially the same level of ductility. The increase in strength is as much as 48% over that of the Sn—3.5% Ag alloy. This strengthening from the Zn additions is attributed to a uniform solidification structure and a substantial refinement of the precipitates in the alloy. Essentially all of the added Zn resides in the more corrosion-resistant, Ag-based, intermetallic precipitates, leaving the Sn-rich matrix primarily free of Zn in solid solution.

2 Claims, 4 Drawing Sheets

ZINC ADDITIONS TO SN-3.5% AG

50 μm

5 μm

50 μm

5 μm

ARTICLE COMPRISING A PB-FREE SOLDER HAVING IMPROVED MECHANICAL PROPERTIES

This application is a continuation of application Ser. No. 08/368,728, filed on Jan. 4, 1995, abandoned, which is a continuation of Ser. No. 08/284,028, filed Aug. 1, 1994 (abandoned), which is a continuation of which application is a continuation of application Ser. No. 08/020,508, filed on Feb. 22, 1993, now abandoned.

FIELD OF THE INVENTION

This invention relates to an article comprising solder, more specifically Pb-free solder.

BACKGROUND OF THE INVENTION

Solder bonding is a critical step in many industrial processes, e.g., in semiconductor device manufacture. The currently most widely used solder probably is the eutectic Pb—Sn alloy. However, due to the toxicity of lead (Pb), there is currently substantial interest in finding a Pb-free substitute solder alloy.

The eutectic tin-silver (Sn—Ag) alloy is a known Pb-free solder, (see W. B. Hampshire, *Electronic Materials Handbook* Vol. 1, Packaging, ASM International, Metals Park, Ohio, 1989, p. 633) that has some advantageous characteristics, e.g., good ductility. Unfortunately, the alloy also has some drawbacks, e.g., insufficient creep resistance especially for applications requiring high dimensional stability. The manufacturing yields and service lifetimes of microelectronic products often depend on the mechanical integrity of solder joints. While breaking is the most obvious problem, misalignment of a laser chip by mechanical creep and the resultant loss of information in the optical system is also a problem. It would be desirable to have available a Sn—Ag based solder composition that has improved mechanical strength and creep resistance while retaining the advantageous characteristics of the prior art Sn—Ag solder. This application discloses such compositions.

SUMMARY OF THE INVENTION

We have made the unexpected discovery that the addition of Zn to a Sn—Ag alloy can result in a solder composition of improved mechanical properties. Thus, in a broad aspect, this invention relates to Pb-free solder alloys based on a tin-silver-zinc (Sn—Ag—Zn) system. More particularly, the invention is embodied in an article that comprises an essentially Pb-free solder composition comprising at least 50% (typically at least 80%) by weight Sn, between 0.1 and 10% by weight Ag and an effective amount of Zn for increasing the ultimate tensile stress (UTS) and/or offset yield strength (YS) of the solder composition by at least 10% of an otherwise identical Zn-free comparison composition. In an exemplary preferred embodiment, the composition comprises 1% Zn, 3.5% Ag and 95.5% Sn.

We have found that the addition of Zn to Sn—Ag binary alloys can produce a uniform and refined microstructure with very small precipitates, and result in significantly improved mechanical strength while maintaining substantially the same level of ductility as in a corresponding Zn-free alloy. The Zn addition typically also improves the character of the solidified alloy's surface by making it smoother. The added Zn typically combines with corrosion-resistant $Ag_3Sn$ type precipitates, resulting in a relatively corrosion resistant solder.

DETAILED DESCRIPTION

Figure 1:
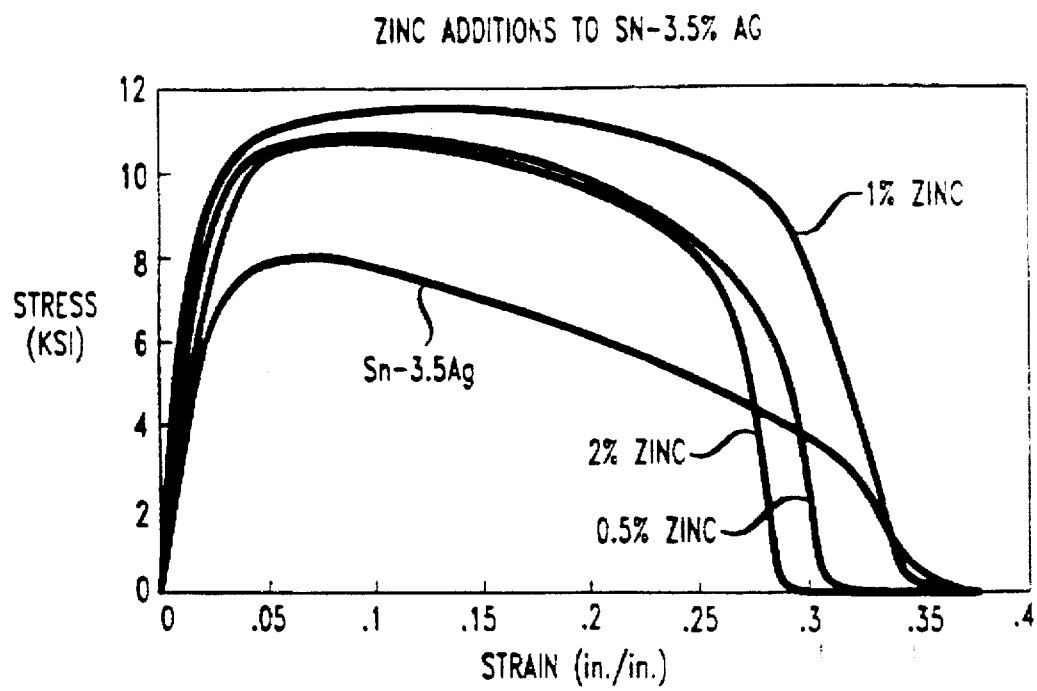
FIG. 1 illustrates the effect of Zn additions on the tensile properties of Sn—3.5 wt % Ag solder.

This invention is embodied in Pb-free solder alloys, based on a Sn—Ag—Zn system, which can have substantially improved microstructures and improved mechanical properties (including strength) over a binary Sn—Ag alloy. The improved strength of the alloy is believed to be a result of the addition of zinc (Zn), which can cause a uniform solidification structure and a pronounced refinement of the intermetallic precipitates in the solder alloy.

In the past, Zn typically has been avoided as a solder alloying addition due to, inter alia, the susceptibility of Zn to corrosion. (See W. B. Hampshire, *Electronic Materials Handbook* Vol. 1, Packaging, ASM International, Metals Park, Ohio, 1989, p. 639). We have discovered that, contrary to expectations, addition of Zn to Sn—Ag based alloys need not result in significantly increased susceptibility to corrosion. This unexpected result is believed to be due to a tendency of the added Zn to combine with corrosion-resistant elements, such as Ag, within intermetallic phases.

In general, a solder alloy comprising a fine uniform dispersion of small precipitates in a matrix phase is likely to have good mechanical strength. Diffusion, especially at elevated temperatures, however, often leads to precipitate coarsening in, e.g., Pb—Sn solder, which decreases the mechanical strength of the solder by creating fewer, larger precipitates and allowing propagation of fatigue cracks along the coarsened, mechanically soft region.

It is known that there is substantially no solid solubility of Ag in Sn. Thus essentially all the Ag in the Sn—3.5% (by weight) Ag eutectic alloy resides in $Ag_3Sn$ intermetallic phase particles, and the Sn—3.5% Ag alloy is much more stable than the eutectic Pb—Sn alloy with respect to precipitate coarsening because of the difficulty in diffusing Ag atoms through solid Sn. However, the intermetallic phase particles in eutectic Sn—Ag typically are relatively coarse, with attendant relatively low strength compared to the inventive solder composition.

We have discovered that the addition of Zn to a Sn—Ag alloy can improve both the mechanical strength and creep resistance properties while substantially maintaining the ductility, and without substantial increase in the susceptibility to corrosion. We currently believe that the beneficial results of Zn addition are due to microstructural changes (typically formation of more and smaller precipitate particles), together with the substantial incorporation of the Zn into precipitate particles.

Desirable composition ranges for the Sn—Ag—Zn-containing alloys are: Ag in the range of 0.1–10%, preferably 1–6%, and even more preferably 2–5%, Zn in the range of 0.1–10%, preferably 0.2–6%, and even more preferably 0.5–3%, with the remainder of the alloy comprising Sn as the major component. All percentages herein are weight %.

Optionally, alloys according to the invention may also comprise Bi and/or In. The desirable amounts of these additions are: Bi in the range of 0.2–10%, preferably 0.5–6%, and In in the range of 0.2–10%, preferably 0.5–6%. Addition of Bi and/or In will typically lower the melting point. Alloys according to the invention optionally may comprise elements such as Cu or Au, added for various purposes such as raising the melting point, or improving wetting behavior on certain surfaces to be soldered. The desirable amounts of these optional constituents are: Cu in the range of 0.2–10%, preferably 0.5–6%, and Au in the range of 0.2–10%, preferably 0.5–6%. Minor amounts of other elements may also be added for a number of different reasons.

The alloys of this invention may be prepared by a number of different ways known to those skilled in the art, e.g., by melting of a mixture of elemental or partially alloyed metals, preferably in an inert atmosphere. The alloys may also be prepared during deposition into thin or thick films by electrochemical processes such as electroplating, electroless plating and electrophoresis, chemical processes such as chemical vapor deposition, or physical vapor deposition such as evaporation or sputtering.

Compositions according to the invention may be shaped, by any appropriate method, into articles in the form of wires, ribbons, bars, performs, solder paste or cream containing alloy powder, suitable flux material, and other chemical constituents. Solder according to the invention can be used in the manufacture of articles (e.g., comprising a laser solder-bonded to a sub-mount) in conventional manner, e.g., by wave soldering, dip soldering, or reflow soldering of solder paste or deposited and patterned solder layer.

EXAMPLES

Example 1

A Sn—3.5 wt. % Ag binary alloy was prepared from pure Sn and Ag (99.9999% purity). The alloy was melted within a quartz tube having an inside diameter of 14 mm under argon atmosphere, held at 800° C. for 8 hours, and furnace-cooled. The resulting ingot was swaged to 3.7 mm diameter, remelted within 4 mm diameter quartz tubes in an argon atmosphere at 300° C. for 5 minutes, and then cooled to room temperature. The thus produced rods were then machined into tensile specimens with a 0.5-inch gauge length and 0.120-inch gauge diameter. Room temperature tensile tests were performed at a strain rate of $3.33 \times 10^{-3}$ sec$^{-1}$. The 0.2% offset yield strength (YS) of the alloy was approximately 7500 psi, the ultimate tensile strength (UTS) was approximately 8000 psi, and the elongation was approximately 37%. The melting temperature of the alloy was approximately 221° C.

Example 2

Sn—3.5% Ag—1.0% Zn ternary alloy tensile specimens were prepared and tested in substantially the same manner as in Example 1. The results were as follows: the YS was approximately 10000 psi, the UTS was approximately 12000 psi, and the elongation was approximately 35%. The melting point of the alloy was approximately 215° C.

Example 3

An alloy with a composition of 91.5% Sn—3.5% Ag—1% Zn—4% Bi was prepared and tested in substantially the same manner as in Example 1. The mechanical properties were as follows: the YS was approximately 9500 psi, the UTS was approximately 11500 psi and the maximum elongation was approximately 41%. The melting point was approximately 205° C.

Example 4

An alloy with a composition of 87.5% Sn—3.5% Ag—1% Zn—8% Bi was prepared and tested in substantially the same manner as in Example 1. The melting point was approximately 198° C.

Example 5

An alloy with a composition of 91.5% Sn—3.5% Ag—1% Zn—4% In was prepared and tested in substantially the same manner as in Example 1. The melting point was approximately 204° C.

Example 6

An alloy with a composition of 87.5% Sn—3.5% Ag—1% Zn—4% Bi—4% In was prepared and tested in substantially the same manner as in Example 1. The melting point was approximately 197° C.

Figure 2:
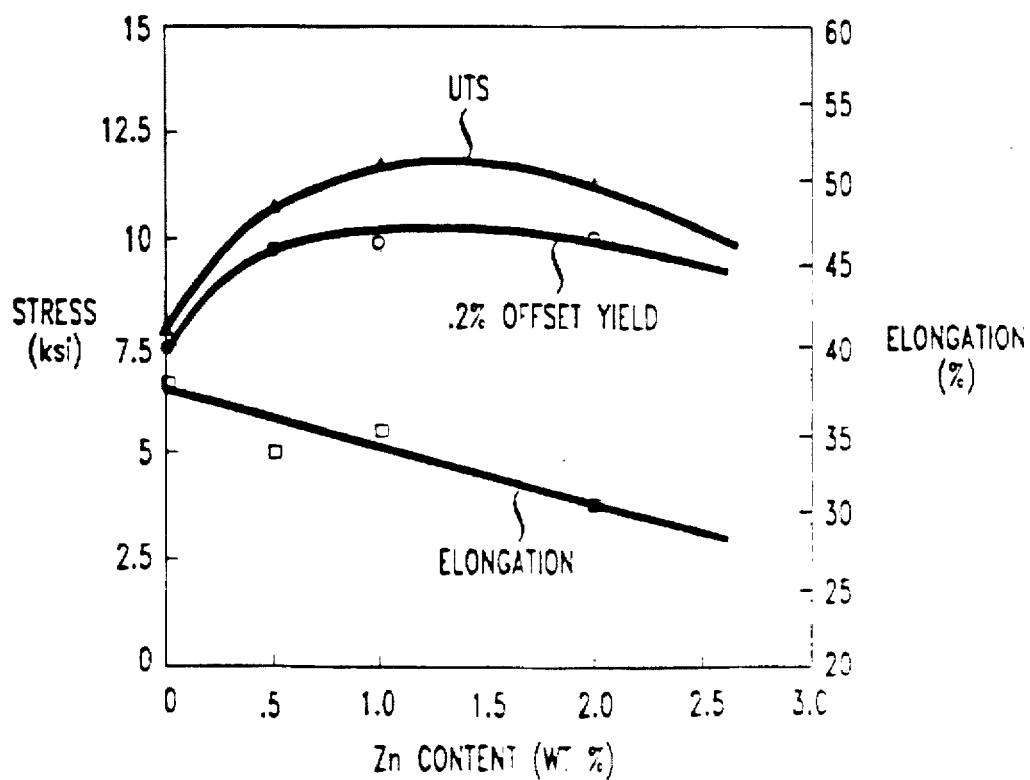
FIG. 2 shows data on some mechanical properties of Sn—Ag—Zn alloys as a function of Zn content.

Tensile, YS, UTS, and elongation tests were performed, substantially as described, on four solder alloy compositions, 96.5% Sn—3.5% Ag, 96% Sn—3.5% Ag—0.5% Zn, 95.5% Sn—3.5% Ag—1% Zn, and 94.5% Sn—3.5% Ag—2% Zn. The room temperature tensile stress-strain curves for the four alloys are shown in FIG. 1. All three ternary compositions (0.5, 1.0, and 2.0 wt. % Zn) exhibit significant increases in both 0.2% offset yield stress and ultimate yield strength, as can be seen from FIG. 2. Peak ultimate strength was observed for approximately 1% Zn, showing about 48% improvement over that of the binary Sn—3.5% Zn alloy. Our data indicate that even relatively small Zn additions can result in substantial improvement (e.g., 10% improvement for 0.1% addition) in mechanical strength. The ductility of compositions according to the invention, as measured by the elongation to failure, typically is comparable to that of the Sn—3.5% Ag binary alloy, which is surprising, considering typically the significantly greater tensile strength of the former.

Figure 3:
FIGS. 3 and 4 are micrographs of the prior art Sn—3.5% Ag alloy.
Figure 4:

Scanning electron microscopy clearly reveals microstructural differences between the Sn—3.5% Ag binary alloy (Zn-free) and the Zn-containing alloys. See FIGS. 3 to 6. The dark contrast in these micrographs is associated with the Sn-phase and the lighter contrast is associated with an intermetallic phase, typically of the Ag$_3$Sn-type. The Sn—3.5% Ag binary alloy (FIGS. 3 and 4), exhibits a rather coarse and non-uniform solidification microstructure. In FIG. 3, the large dark globules are Sn dendrites, which occupy as much as 20–30% volume in the alloy.

Figure 5:
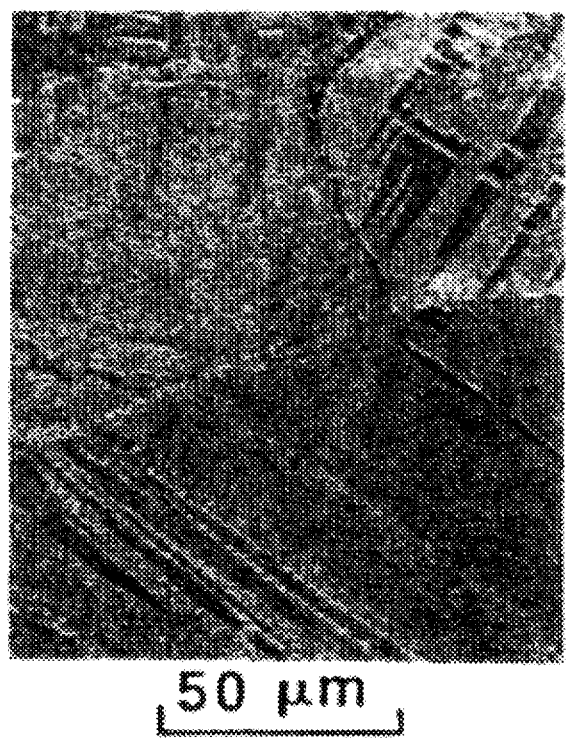
FIGS. 5 and 6 are micrographs of a sample of Sn—3.5% Ag—1% Zn alloy.
Figure 6:
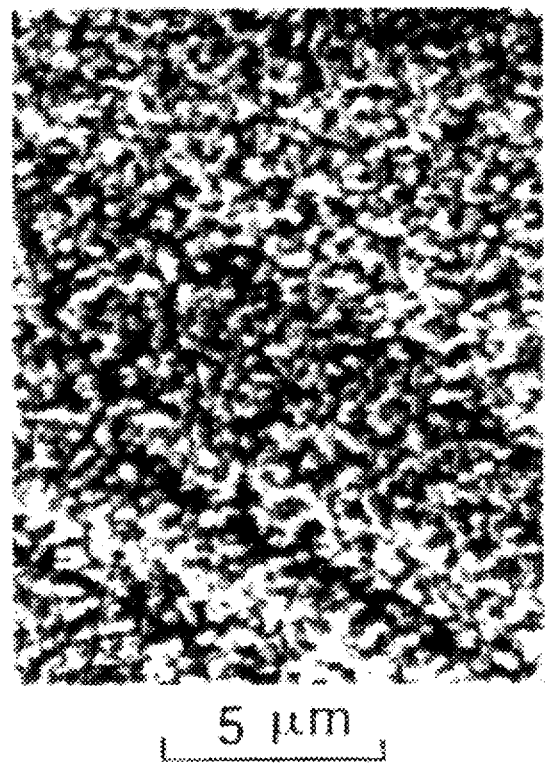

The 95.5% Sn—3.5% Ag—1% Zn alloy exhibits a very different microstructure. As shown in FIGS. 5, and 6, the microstructure is substantially uniform, and has finely dispersed small (e.g., ~0.3 μm diameter) precipitate (Ag$_3$Sn-type) particles. Within EDXA (energy dispersive x-ray analysis) detection limits, the Zn was found exclusively within the precipitate phase. Thus, Zn can have both a spheroidizing and a refining effect on the Ag$_3$Sn-type precipitates. We believe that this very fine, uniform, two-phase structure is largely responsible for the observed improvement in properties.

Differential scanning calorimetry (DSC) of the four alloys showed small melting point depressions in the ternary, zinc-containing alloys when compared to the binary Sn—3.5% Ag eutectic alloy's melting temperature of 221° C. The melting points of the 0.5, 1 and 2% Zn ternary alloys were, respectively, 1–2, 4 and 4° C. lower than that of the eutectic binary alloy. Lower melting temperature is desirable when a more or less direct replacement for the Pb—Sn solder (e.g. melting point is approximately 183° C. for the eutectic 40Pb—60Sn alloy) is considered. Higher melting temperature is desirable for higher service temperatures.

Additional alloying additions may be made to further adjust the melting temperature of the Sn—Ag—Zn alloy as described in the Examples 4–6.

The surface features of solidified binary Sn—Ag solder alloys are, typically undesirably, frequently rough and covered with large needle-like $Ag_3Sn$ precipitates. The microstructural refinement that occurs in the Zn-containing alloys also alleviates these surface roughness problems. The smoothness of the Zn-containing alloys can be dramatic when compared to the binary Sn—Ag alloy.

Thermal fatigue and/or mechanical creep occurs more readily when elevated temperature cycles are involved. Diffusion is enhanced at elevated temperatures, therefore microstructural coarsening is more likely to occur. Since regions of inhomogeneous microstructural coarsening are known to be preferred sites for fatigue and creep cracks to initiate, one of the keys to improved solder joint reliability is the ability to produce and stabilize fine, uniform microstructures. The present work demonstrates that Zn additions to Sn—Ag alloys can accomplish this.

Figure 7:
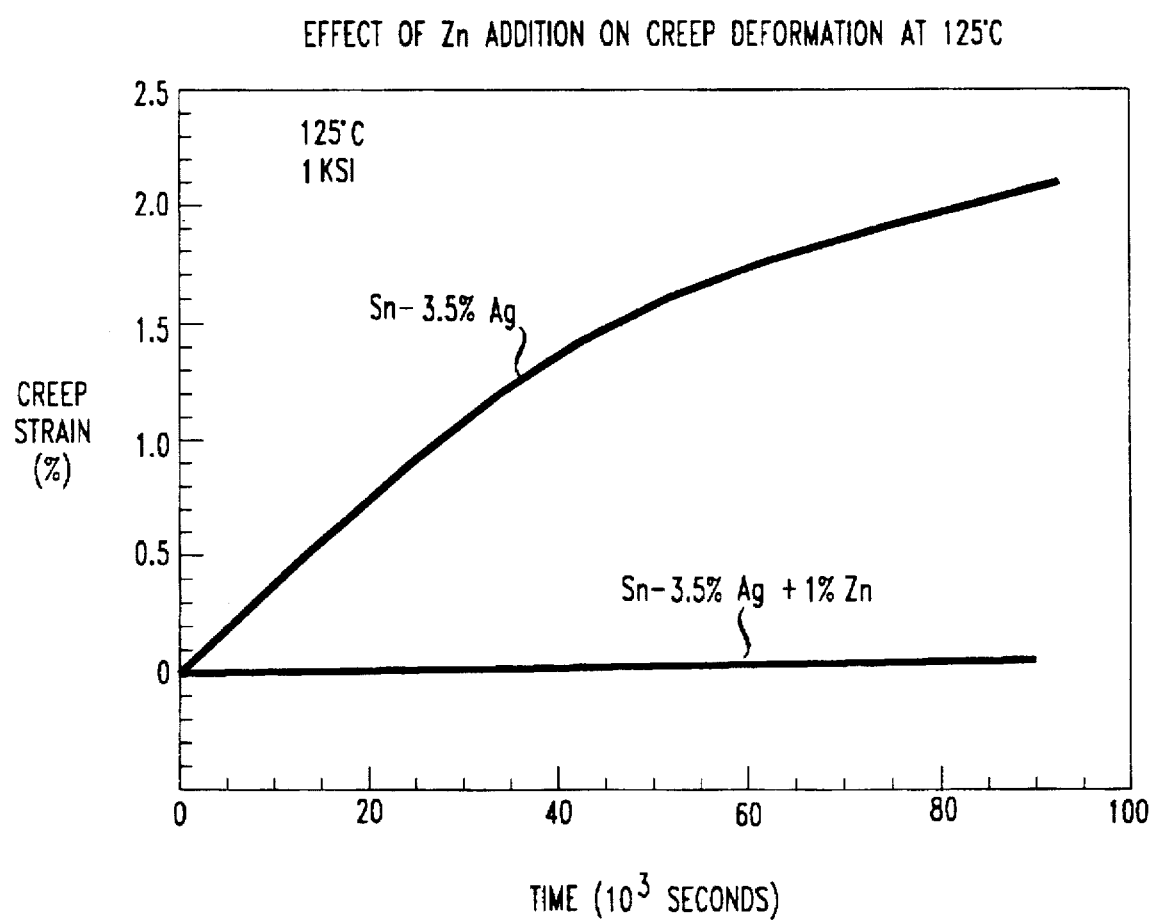
FIG. 7 compares creep deformation in the Sn—3.5% Ag and Sn—3.5% Ag—1% Zn alloys.

FIG. 7 illustrates differences in compressive creep deformation between the prior art binary alloy and an exemplary ternary alloy according to the invention, at 125° C. under approximately 1000 psi pressure (1 ksi). As is evident from the figure, the addition of Zn dramatically reduces creep resistance. Even relatively small Zn additions (e.g., 0.1%) can result in substantial desirable improvement in creep resistance, e.g., by at least 20%.

Furthermore, it is likely that the addition of Zn to the prior art composition can have additional benefits such as improving solder wetting and adhesion on Cu-, Zn-, or Al-containing surfaces by forming, solid solutions and/or intermetallic compounds at the interface.

We claim:

1. An article comprising a lead-free solder composition, the composition consisting essentially of by weight:

0.2–6.0% zinc;
 1.0–6.0% silver;
 0.2–6.0% indium; and
 82–98.6% tin.

2. An article comprising a lead-free solder composition, the composition consisting essentially of by weight:

0.2–6.0% zinc;
 1.0–6.0% silver;
 0.2–6.0% indium;
 0.2–6.0% bismuth; and
 76–98.4% tin.

* * * * *